(12) United States Patent
Ha et al.

(10) Patent No.: US 9,794,517 B2
(45) Date of Patent: Oct. 17, 2017

(54) PRIVACY MASKING METHOD

(71) Applicant: Hanwha Techwin Co., Ltd., Changwon-si (KR)

(72) Inventors: Jae Ryong Ha, Changwon-si (KR); Ki Bum Park, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 134 days.

(21) Appl. No.: 14/779,497

(22) PCT Filed: Feb. 12, 2014

(86) PCT No.: PCT/KR2014/001143
§ 371 (c)(1),
(2) Date: Jan. 5, 2016

(87) PCT Pub. No.: WO2014/157830
PCT Pub. Date: Oct. 2, 2014

(65) Prior Publication Data
US 2016/0150188 A1    May 26, 2016

(30) Foreign Application Priority Data
Mar. 26, 2013 (KR) ........................ 10-2013-0032305

(51) Int. Cl.
| *H04N 7/18* | (2006.01) |
|---|---|
| *H04N 7/167* | (2011.01) |
| *H04N 5/262* | (2006.01) |
| *G06T 7/20* | (2017.01) |
| *H04N 5/232* | (2006.01) |
| *H04N 5/272* | (2006.01) |
| *G06T 7/70* | (2017.01) |

(52) U.S. Cl.
CPC ............... *H04N 7/167* (2013.01); *G06T 7/20* (2013.01); *G06T 7/70* (2017.01); *H04N 5/23296* (2013.01); *H04N 5/262* (2013.01); *H04N 5/272* (2013.01); *H04N 7/183* (2013.01)

(58) Field of Classification Search
USPC ................................ 348/137, 140, 142–143
See application file for complete search history.

(56) References Cited

U.S. PATENT DOCUMENTS

| 2006/0158527 A1* | 7/2006 | Kang | ..................... H04N 5/232 |
|---|---|---|---|
|  |  |  | 348/211.99 |
| 2006/0192853 A1* | 8/2006 | Lee | ........................... G06T 3/00 |
|  |  |  | 348/143 |
| 2012/0096126 A1* | 4/2012 | Kamei | .................. H04N 7/185 |
|  |  |  | 709/219 |

FOREIGN PATENT DOCUMENTS

| JP | 2011-205517 A | 10/2011 |
|---|---|---|
| KR | 10-2005-0011781 A | 1/2005 |
| KR | 10-2006-0133265 A | 12/2006 |

(Continued)

OTHER PUBLICATIONS

International Search Report (PCT/ISA/210) dated May 14, 2014, issued in International Application No. PCT/KR2014/001143.

*Primary Examiner* — Nigar Chowdhury
(74) *Attorney, Agent, or Firm* — Sughrue Mion, PLLC (57) ABSTRACT

A privacy masking method is provided. The privacy masking method is configured to accurately position a mask area on a privacy area in a captured image despite any kind of camera movement. Therefore, even if a camera makes any one or more of pan, tilt, and zoom movements, the present invention can accurately match a mask area with a privacy area.

18 Claims, 7 Drawing Sheets

(56) References Cited

FOREIGN PATENT DOCUMENTS

KR       10-0719120 B1    5/2007
KR    10-2012-0105782 A    9/2012

\* cited by examiner

PRIVACY MASKING METHOD

TECHNICAL FIELD

The present invention relates to a privacy masking method, and more particularly, to a privacy masking method for setting a privacy mask (i.e., hiding an area or subject that needs to be concealed to protect personal privacy) in an image captured by a surveillance camera.

BACKGROUND ART

In general, a surveillance camera system can prevent or avert crimes and accidents but is likely to violate personal privacy. This is because even privacy-related parts can be captured by a surveillance camera.

Accordingly, a technology for hiding a privacy area or a subject in an image captured by a surveillance camera is being employed.

This conventional technology is called privacy masking technology (i.e., hiding an area or subject that needs to be concealed to protect personal privacy). The privacy masking technology makes a monitor unable to view a privacy area or a subject that needs to be protected from invasion of privacy by processing an image.

Here, a part of the image which is processed to be hidden from view by the monitor is referred to as a 'mask area.'

In addition, a general fixed surveillance camera displays the screen that does not change. Therefore, according to the conventional technology, after a privacy mask is fixed once, the mask area continuously matches the privacy area or the subject to be hidden without a problem.

In the case of a pan, tilt and zoom (PTZ) camera, however, when the PTZ camera makes one or more of pan, tilt and zoom movements, the privacy area or the subject to be hidden is also moved. Accordingly, in the conventional technology, the mask area may also move but cannot accurately match the privacy area or the subject to be hidden. In some cases, there is a very high rate of mismatch between the mask area and the privacy area or the subject to be hidden.

DISCLOSURE

Technical Problem

The present invention has been made to solve the foregoing problems of the prior art and therefore an aspect of the present invention is to provide a privacy masking method for accurately positioning a mask area on a privacy area in a captured image despite any kind of camera movement.

However, aspects of the present invention are not restricted to the one set forth herein. The above and other aspects of the present invention will become more apparent to one of ordinary skill in the art to which the present invention pertains by referencing the detailed description of the present invention given below.

Technical Solution

According to an aspect of the present invention, there is provided a private masking method including: setting a privacy mask for a privacy area in an image captured by a camera; executing a fine adjustment mode for a mask area when the mask area formed in the captured image through the setting of the privacy mask deviates from the privacy area and when a predetermined mask area deviation condition is satisfied; generating position data used to determine relative positions of a subject of the captured image and the camera by operating a distance measurement sensor provided on a side of the camera; specifying a privacy area movement value which includes the position data; and determining the position and size of the privacy area based on the privacy area movement value and adjusting the mask area using the determined position and size of the privacy area.

The privacy masking method may include: interpreting the captured image; comparing the interpretation result of the captured image with that of a previously captured image; and generating an image displacement value which is determined based on the comparison result, wherein the privacy area movement value further includes the image displacement value.

According to another aspect of the present invention, there is provided a privacy masking apparatus including: a mask setting module which sets a privacy mask for a privacy area in an image captured by a camera; a mask adjustment module which executes a fine adjustment mode for a mask area when the mask area formed in the captured image through the setting of the privacy mask deviates from the privacy area and when a predetermined mask area deviation condition is satisfied; and a distance measurement sensor which measures a relative distance to a subject of the captured image in the fine adjustment mode, wherein the mask adjustment module generates position data used to determine relative positions of the subject and the camera based on a measured value of the distance measurement sensor, specifies a privacy area movement value which includes the position data, determines the position and size of the privacy area based on the privacy area movement value, and adjusts the mask area using the determined position and size of the privacy area.

The privacy masking apparatus may further include an image output module which interprets the captured image, compares the interpretation result of the captured image with that of a previously captured image, and generates an image displacement value as the comparison result.

The mask adjustment module may further include the image displacement value in the privacy area movement value.

Advantageous Effects

Therefore, the present invention can accurately position a mask area on a privacy area in a captured image despite any kind of camera movement. Therefore, even if a camera makes any one or more of pan, tilt, and zoom movements, the present invention can match a mask area with a privacy area or a subject to be hidden.

However, the effects of the present invention are not restricted to the one set forth herein. The above and other effects of the present invention will become more apparent to one of daily skill in the art to which the present invention pertains by referencing the claims.

DESCRIPTION OF DRAWINGS

The above and other aspects and features of the present invention will become more apparent by describing in detail exemplary embodiments thereof with reference to the attached drawings, in which.

MODE FOR INVENTION

Hereinafter, exemplary embodiments of the present invention will be described in detail with reference to the attached drawings.

Figure 1:
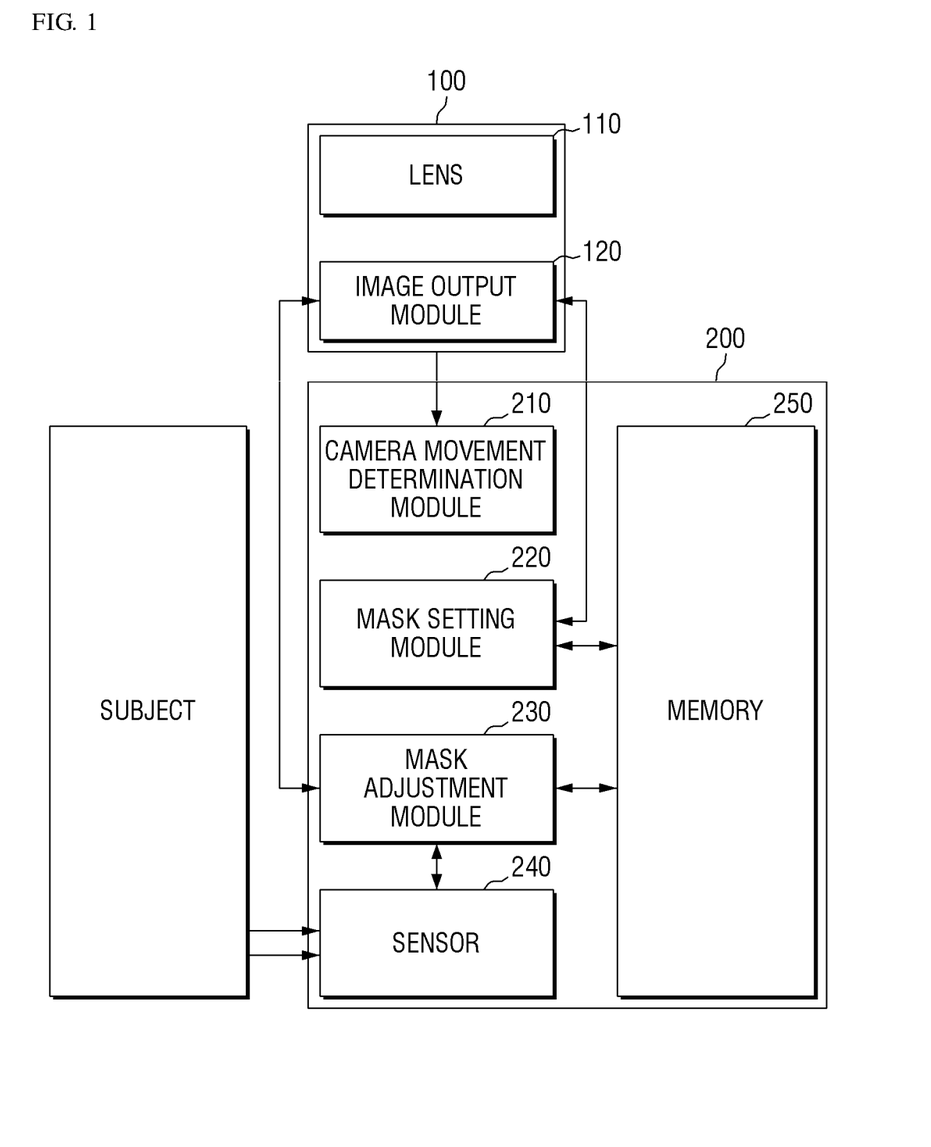
FIG. 1 illustrates a privacy masking apparatus according to an embodiment of the present invention.

FIG. 1 illustrates a privacy masking apparatus 200 according to an embodiment of the present invention.

Referring to FIG. 1, the privacy masking apparatus 200 is an apparatus that operates in connection with a camera 100. That is, the privacy masking apparatus 200 is an apparatus that sets a privacy mask on an image captured by the camera 100. The privacy masking apparatus 200 can accurately position a mask area on a privacy area or a subject to be hidden in a captured image without being limited by the movement (one or more of pan, tilt and zoom movements) of the camera 100.

The camera 100 may include a lens 110 which is used to capture a subject at a fixed or variable magnification and an image output module 120 which outputs an image captured through the lens 110 in a form recognizable by a user (e.g., a monitor when the camera 100 is a surveillance camera).

Here, the camera 100 can make any one or more of the pan movement, the tilt movement, and the zoom movement. These movements of the camera 100 can be made by an external device or manually by the user.

That is, the pan movement is to move a captured image horizontally, and the tilt movement is to move the camera 100 perpendicularly to an axis of the camera 100. In addition, the zoom movement is not to move the camera 100 but to zoom in or out by changing the magnification of the lens 110 of the camera 100 so as to resize a captured image.

In addition, the privacy masking apparatus 200 is configured to set a mask area or readjust the set mask area. The privacy masking apparatus 200 specifies a privacy area movement value according to the zoom magnification and position of a subject and accurately positions a mask area using the specified privacy area movement value.

To this end, the privacy masking apparatus 200 may include a mask setting module 220, a mask adjustment module 230, a sensor 240, and a memory 250.

In addition, the privacy masking apparatus 200 may further include a camera movement determination module 210 which determines the direction and width of camera movement or additionally determines a zoom magnification value in the case of application of a zoom function.

The mask movement determination module 210 may determine the direction and width of movement of the camera 100 or determine the zoom magnification value in the case of application of the zoom function.

The mask setting module 220 initially sets a privacy mask for a particular area in a captured image. In addition, the mask setting module 220 serves as an interface needed for the user to set a privacy mask by providing various option menus for setting the privacy mask.

When a privacy mask function is applied, the mask adjustment module 230 can be automatically executed in accordance with the movement of the camera 100.

That is, when the privacy mask function is activated by the mask setting module 220, the mask adjustment module 230 may operate in connection with any one or more of an image output module and the camera movement determination module 210 to obtain information about how a captured image is being changed and determine whether to adjust a mask area for a privacy area or a subject to be hidden in the captured image based on the obtained information.

Here, when determining to finely adjust the mask area, the mask adjustment module 230 executes a fine adjustment mode for finely adjusting the mask area.

That is, the mask adjustment module 230 executes the fine adjustment mode for the mask area when the mask area formed in the captured image through the setting of the privacy mask deviates from the privacy area and when a predetermined mask area deviation condition is satisfied.

Here, the mask area deviation condition may include a case where the degree of matching between the privacy area and the mask area exceeds a threshold level.

In the fine adjustment mode, the mask adjustment module 230 specifies a privacy area movement value corresponding to the zoom magnification and position of a subject after the movement of the camera 100.

Here, the privacy area movement value is a value determined based on any one or more of focus distance data for each zoom magnification which is stored as a value indicating a relative distance to a subject when the subject is in focus of the camera 100 and position data which is determined by the sensor 240 for identifying relative positions of the subject and the camera 100.

Figure 15:
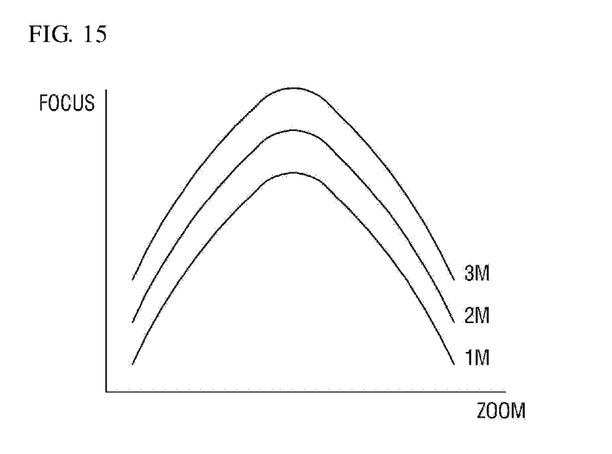
FIG. 15 illustrates position data with respect to zoom magnification applied to the apparatus of FIG. 1 according to an embodiment of the present invention.

That is, as illustrated in FIG. 15, the focus distance data for each zoom magnification is data indicating a distance to a subject captured by the camera 100 when the camera 100 is in focus.

In addition, the position data determined by the sensor 240 is data measured by an ultrasonic sensor, a laser sensor, or a global positioning system (GPS) sensor. The position data cannot only be data used to identify a distance between a subject and the camera 100 but also a source used to identify the directivity of the camera 100 toward the subject.

Using the specified privacy area movement value, the mask adjustment module 230 determines the accurate position and size of the privacy area or the subject to be hidden in the changed captured image and adjusts the mask area based on the determined position and size.

Accordingly, the mask adjustment module 230 can finely adjust the mask area. Therefore, even if the captured area is changed by any movement of the camera 100, the privacy area or the subject to be hidden can be accurately covered.

Figure 2:
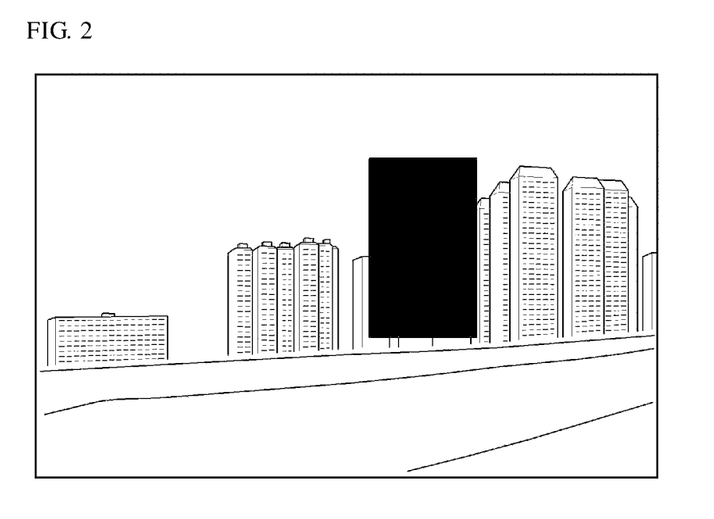
FIGS. 2 and 3 illustrate an embodiment of setting a mask area using the apparatus of FIG. 1.
Figure 3:
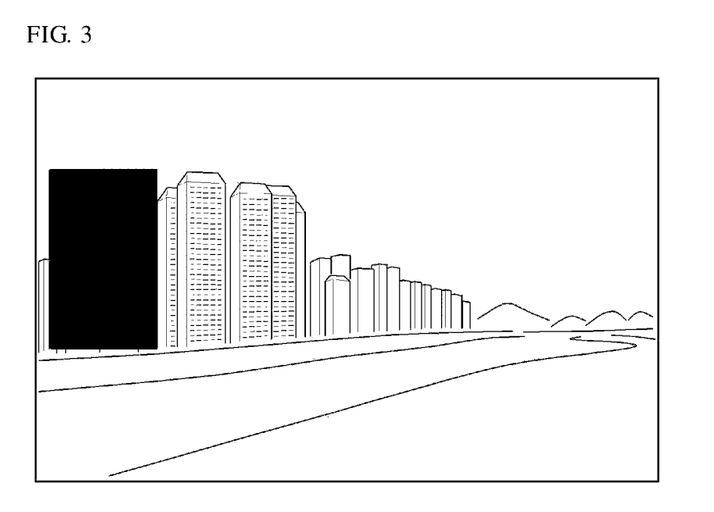

For example, referring to FIGS. 2 and 3, when the camera 100 is panned horizontally, a first captured image shown in FIG. 2 is changed to a second captured image shown in FIG. 3. However, since the movement of the camera 100 is the pan movement, this is not a situation where the privacy masking apparatus 200 should change the size of a mask area A.

That is, when the camera 100 is panned horizontally, the privacy masking apparatus 200 changes the position of the mask area A by reflecting only the width of horizontal movement of the camera 100. Therefore, the probability that the mask area A will deviate from the privacy area is very low.

Also, the privacy masking apparatus 200 may further include an image output module (not illustrated) which interprets a captured image, compares the interpretation result of the captured image with that of a previously captured image, and generates an image displacement value as the comparison result.

That is, the mask adjustment module 230 may further include the image displacement value provided by the image output module (not illustrated) in the privacy area movement value. Accordingly, the mask adjustment module 230 can determine the position and size of the privacy area more accurately and, ultimately, adjust the mask area more finely.

Figure 4:
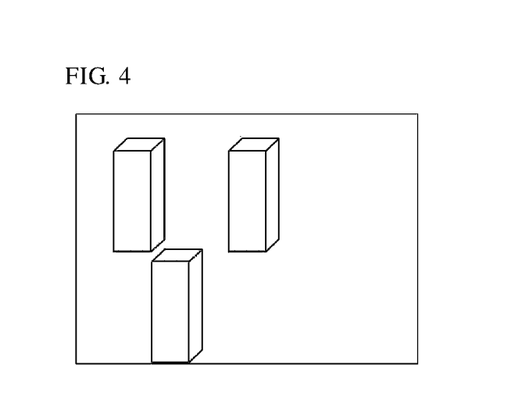
FIGS. 4 through 6 illustrate another embodiment of setting a mask area using the apparatus of FIG. 1.
Figure 5:
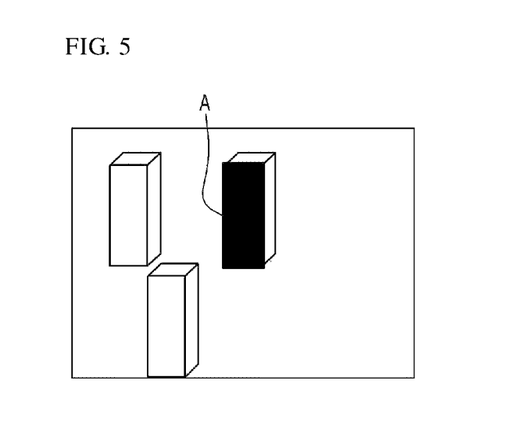
Figure 6:
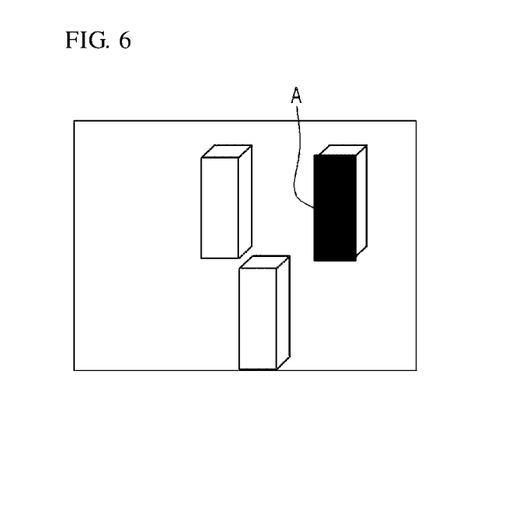

In addition, FIGS. 4 through 6 illustrate a case where the camera 100 is panned horizontally as illustrated in FIGS. 2 and 3 by simplifying subjects. That is, FIGS. 4 through 6 illustrate a case where the probability that a mask area A will deviate from a privacy area is very low.

Figure 7:
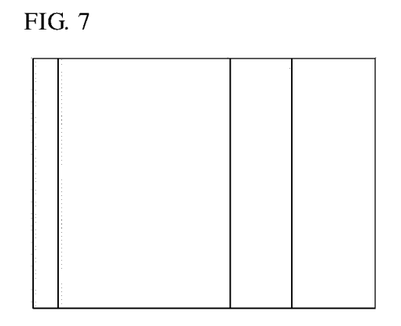
FIGS. 7 through 9 illustrate an example in which a mask area of FIGS. 4 through 6 is zoomed in and then moved.
Figure 8:
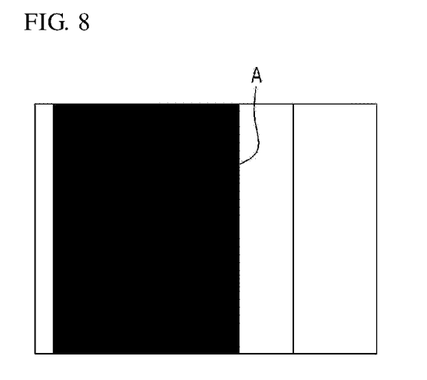
Figure 9:
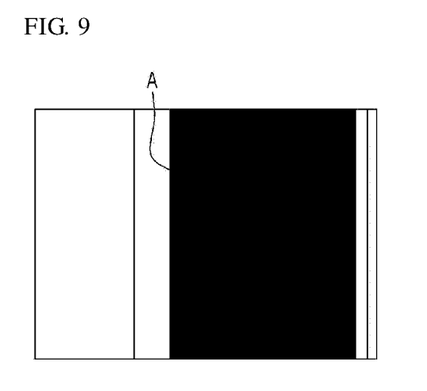

On the other hand, FIGS. 7 through 9 illustrate an example in which the mask area of FIGS. 4 through 6 is zoomed in and then moved. This is a situation where as a captured image is changed, the size of the mask area A is also changed.

In FIGS. 7 through 9, the size of the mask area A is increased as much as the zoom magnification of the captured image is increased. In addition, a range in which the captured image is moved in accordance with the movement of the camera 100 after the zoom magnification is increased is different from a range in which the captured image is moved in accordance with the movement of the camera 100 before the zoom magnification is increased.

Due to errors including the above difference, the mask area A does not match the preset privacy area as illustrated in FIG. 9.

Figure 10:
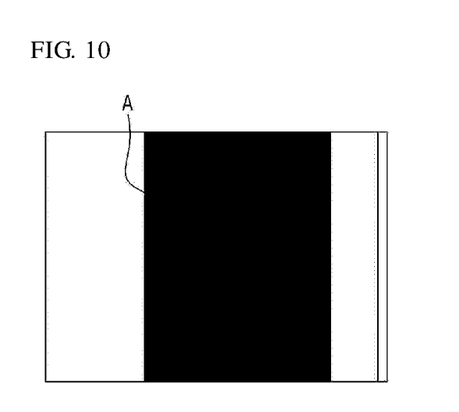
FIG. 10 illustrates the result of correcting a problem identified in FIG. 9 by using the privacy masking apparatus of the present invention.

FIG. 10 illustrates the result of correcting a problem identified in FIG. 9 by using the privacy masking apparatus 200 of the present invention.

Referring to FIG. 10, the privacy masking apparatus 200 takes into consideration the fact that the range in which the captured image is moved in accordance with the movement of the camera 100 after the zoom magnification is increased is different from the range in which the captured image is moved in accordance with the movement of the camera 100 before the zoom magnification is increased. Therefore, a mask area A" can continuously match the preset privacy area as illustrated in FIG. 10.

That is, this is possible because the privacy masking apparatus 200 can additionally specify a privacy area movement value according to the zoom magnification and position of a subject and determine the accurate position and size of a privacy area using the specified privacy area movement value.

Figure 11:
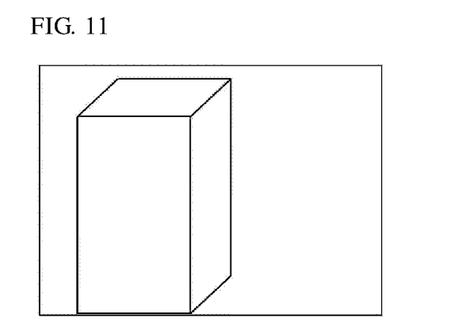
FIGS. 11 through 13 illustrate an example in which a mask area of FIGS. 7 through 9 is zoomed out and then moved.
Figure 12:
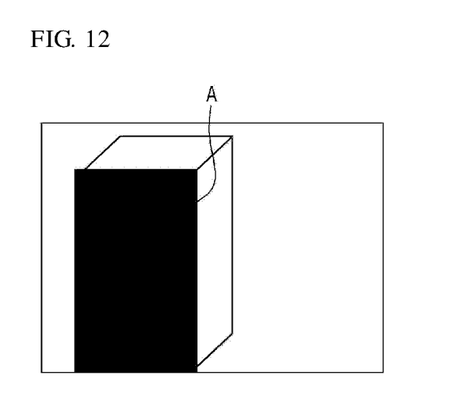
Figure 13:
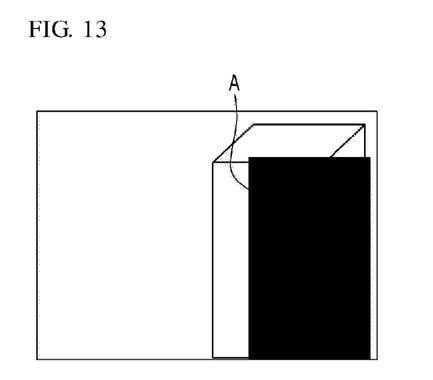

FIGS. 11 through 13 illustrate an example in which the mask area of FIGS. 7 through 9 is zoomed out and then moved.

Referring to FIGS. 11 through 13, the size of the mask area A is reduced as much as the zoom magnification of the captured image is reduced. In addition, a range in which the captured image is moved in accordance with the movement of the camera 100 after the zoom magnification is reduced is different from a range in which the captured image is moved in accordance with the movement of the camera 100 before the zoom magnification is reduced.

Due to errors including the above difference, the mask area A does not match the preset privacy area as illustrated in FIG. 13.

Figure 14:
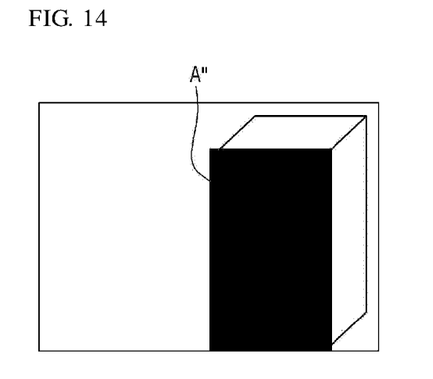
FIG. 14 illustrates the result of correcting a problem identified in FIG. 13 by using the privacy masking apparatus of the present invention.

FIG. 14 illustrates the result of correcting a problem identified in FIG. 13 by using the privacy masking apparatus 200 of the present invention. That is, when the mask area is corrected using the privacy masking apparatus 200, a mask area A" can continuously match the preset privacy area as illustrated in FIG. 14.

Figure 16:
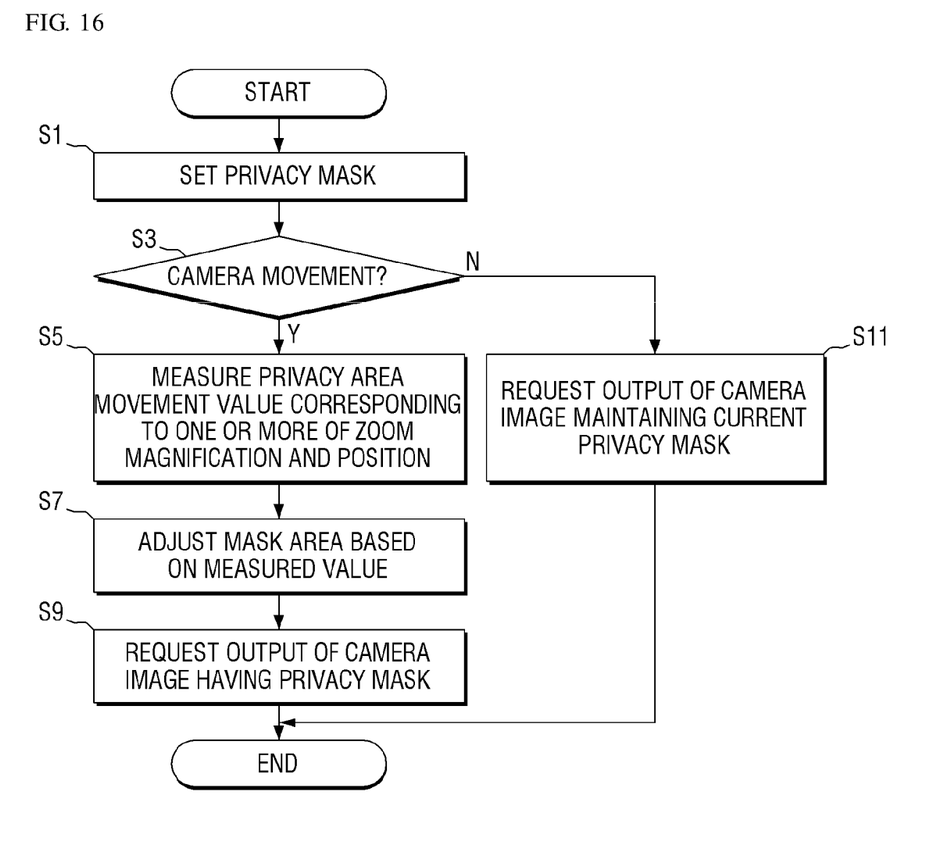
FIG. 16 illustrates an operation process of the apparatus of FIG. 1 according to an embodiment of the present invention.

FIG. 16 illustrates an operation process of the apparatus of FIG. 1 according to an embodiment of the present invention.

Referring to FIG. 16, in a privacy masking method, when any one area in a captured image has to be hidden for privacy reasons, a privacy mask may be set for the area (operation S1).

In operation S1 in which the privacy mask is set, a single privacy mask or a plurality of privacy masks can be set.

That is, when a single privacy mask is set, a single mask area may be finely adjusted. When a plurality of privacy masks are set, a plurality of mask areas may be finely adjusted.

After operation S1 in which the privacy mask is set, it is determined whether a camera 100 has been moved (operation S3).

When it is determined in operation S3 that the camera 100 has been moved, a fine adjustment mode for finely adjusting a mask area may be executed. In particular, the movement of the camera 100 can be limited to a movement that also requires the size of the mask area to be changed.

When the fine adjustment mode is executed, a privacy area movement value, which corresponds to one or more of a zoom magnification and a position of a subject according to the movement of the camera 100, is specified (operation S5).

When both the zoom magnification and the position of the subject are taken into consideration, the privacy area movement value may be determined to be the mean of a first privacy area movement value corresponding to the zoom magnification of the subject and a second privacy area movement value corresponding to the position of the subject or may be determined based on optimum experiments and statistics about the movement of the privacy area corresponding to the zoom magnification and position of the subject.

Next, the mask area is finely adjusted based on the privacy area movement value specified in operation S5 (operation S7).

Then, the privacy masking apparatus 200 requests the camera 100 to output an image that reflects the execution result of operation S7 (operation S9).

On the other hand, when it is determined in operation S3 that the camera 300 has not been moved or, even if the camera 300 has been moved, when the probability that the mask area will deviate from the privacy area is very low, the fine adjustment mode for the mask area is not executed (operation S11).

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

INDUSTRIAL APPLICABILITY

In addition, the present invention can accurately position a mask area on a privacy area in a captured image despite any kind of camera movement. Therefore, the present invention cannot only fully come onto the market and is commercially viable but also can be implemented explicitly in reality. Accordingly, the present invention is industrially applicable.

The invention claimed is:

1. A privacy masking method comprising:
   setting a privacy mask for a privacy area in an image captured by a camera;
   executing a fine adjustment mode for a mask area when the mask area formed in the captured image through the setting of the privacy mask deviates from the privacy area and when a predetermined mask area deviation condition is satisfied;
   generating position data used to determine relative positions of a subject of the captured image and the camera by operating a distance measurement sensor provided on a side of the camera;
   specifying a privacy area movement value which comprises the position data; and
   determining a position a size of the privacy area based on the privacy area movement value and adjusting the mask area using the determined position and size of the privacy area.

2. The method of claim 1, wherein the privacy area movement value further comprises focus distance data for each zoom magnification which is stored as a value indicating a relative distance to the subject when the subject is in focus of the camera.

3. The method of claim 2, wherein the privacy area movement value is a mean of a first privacy area movement value corresponding to zoom magnification of the subject and a second privacy area movement value corresponding to a position of the subject.

4. The method of claim 2, wherein the privacy area movement value is a value generated as a result of combining zoom magnification of the subject and a position of the subject.

5. The method of claim 1, comprising:
   interpreting the captured image;
   comparing the interpretation result of the captured image with that of a previously captured image; and
   generating an image displacement value which is determined based on the comparison result,
   wherein the privacy area movement value further comprises the image displacement value.

6. The method of claim 5, wherein the privacy area movement value is a mean of a first privacy area movement value corresponding to zoom magnification of the subject and a second privacy area movement value corresponding to a position of the subject.

7. The method of claim 5, wherein the privacy area movement value is a value generated as a result of combining zoom magnification of the subject and a position of the subject.

8. The method of claim 1, further comprising adjusting the mask area in a general mode based on movement and zoom magnification of the camera when the predetermined mask area deviation condition is not satisfied.

9. The method of claim 1, wherein the predetermined mask area deviation condition comprises the movement of the camera which requires a size of the mask area to be changed.

10. The method of claim 1, further comprising setting one or more other privacy masks for the captured image.

11. The method of claim 10, further comprising:
    executing a fine adjustment mode for one or more mask areas when the mask areas from among a plurality of mask areas formed in the captured image through the setting of privacy masks deviate from corresponding privacy areas and when the predetermined mask area deviation condition is satisfied; and
    adjusting the deviated mask areas based on the privacy area movement value.

12. A privacy masking apparatus comprising:
    a mask setting module which sets a privacy mask for a privacy area in an image captured by a camera;
    a mask adjustment module which executes a fine adjustment mode for a mask area when the mask area formed in the captured image through the setting of the privacy mask deviates from the privacy area and when a predetermined mask area deviation condition is satisfied; and
    a distance measurement sensor which measures a relative distance to a subject of the captured image in the fine adjustment mode,
    wherein the mask adjustment module generates position data used to determine relative positions of the subject and the camera based on a measured value of the distance measurement sensor, specifies a privacy area movement value which comprises the position data, determines a position and a size of the privacy area based on the privacy area movement value, and adjusts the mask area using the determined position and size of the privacy area.

13. The apparatus of claim 12, further comprising a camera movement determination module which determines the direction and width of movement of the camera or additionally determines a zoom magnification value in the case of application of a zoom function.

14. The apparatus of claim 13, further comprising an image output module which interprets the captured image, compares the interpretation result of the captured image with that of a previously captured image, and generates an image displacement value as the comparison result.

15. The apparatus of claim 12, further comprising an image output module which interprets the captured image, compares the interpretation result of the captured image with that of a previously captured image, and generates an image displacement value as the comparison result.

16. The apparatus of claim 15, wherein the mask adjustment module further comprises the image displacement value in the privacy area movement value.

17. The apparatus of claim 12, wherein the mask setting module further sets one or more other privacy masks for the captured image.

18. The apparatus of claim 17, wherein the mask adjustment module executes a fine adjustment mode for one or more mask areas when the mask areas from among a plurality of mask areas formed in the captured image through the setting of the privacy masks deviate from corresponding privacy areas and when the predetermined mask area deviation condition is satisfied and adjusts the deviated mask areas based on the privacy area movement value.

* * * * *